UNITED STATES PATENT OFFICE 2,395,826

PREPARATION OF CHLOROFLUOROSILANES

Julian W. Hill, Richard V. Lindsey, Jr., and Richard H. Wiley, Wilmington, Del., assignors to E. I. du Pont de Nemours & Company, Wilmington, Del., a corporation of Delaware No Drawing. Application April 10, 1944, Serial No. 530,398

5 Claims. (Cl. 23—14)

This invention relates to an improved process for the preparation of chlorofluorosilanes.

This invention has as an object the production of chlorofluorosilanes. A further object is the preparation of dichlorodifluorosilane. Additional objects will become apparent from an examination of the following description and claims.

These and other objects and advantages are accomplished by the herein described invention which broadly comprises heating a compound having the general formula $SiCl_3X$, wherein X is an atom selected from the group consisting of chlorine and fluorine atoms, with a compound having the general formula $SiXF_3$, wherein X is an atom selected from the group consisting of fluorine and chlorine atoms.

The following examples, in which proportions are given in parts by weight, are given for illustrative purposes and are not intended to place any restrictions on the herein described invention:

Example I

Two hundred fifty-seven parts of silicon tetrafluoride is bubbled through 272 parts of silicon tetrachloride heated to about 45° C. and the resultant mixture of gases is passed through a glass tube packed with broken porous plate heated to about 600° C. These effluent gases are passed through a vertical condenser maintained at −30° C. Trichlorofluorosilane and unchanged silicon tetrachloride are recycled by returning the condensate directly to the vessel containing the silicon tetrachloride. The gaseous products which pass through the condenser are collected in a trap cooled with a mixture of solid carbon dioxide and acetone. The product is fractionally distilled to obtain 102 parts of trifluorochlorosilane (B. P. −70° C.), 282 parts of dichlorodifluorosilane (B. P. −32° C.) and 13 parts of trichlorofluorosilane (B. P. 12° C.).

Example II

Using a procedure similar to that described in the preceding example, 169 parts of the chlorotrifluorosilane is bubbled through 24 parts of silicon tetrachloride and the resultant mixed gases passed through the glass tube maintained at a temperature of 500° C. Upon distillation of the collected products, there are obtained 58 parts of unchanged chlorotrifluorosilane and 78 parts of dichlorodifluorosilane.

Although the invention is illustrated in the examples by the reaction of silicon tetrafluoride with silicon tetrachloride, trichlorofluorosilane with silicon tetrafluoride and chlorotrifluorosilane with silicon tetrachloride, it is applicable to other combinations of reactants. For example, trichlorofluorosilane and chlorotrifluorosilane can be reacted to obtain additional difluorodichlorosilane. Thus, by proper choice of operating conditions, i. e., reactants, vaporizing temperature, and condensing temperature, and recycling all but the desired silicon halide, any desired chlorofluorosilane can be obtained as the major product.

The reactions of silicon tetrachloride with silicon tetrafluoride, of silicon tetrachloride with chlorotrifluorosilane, of trichlorofluorosilane with silicon tetrafluoride and of trichlorofluorosilane with chlorotrifluorosilane, respectively, may be illustrated by the following equations:

(1) $SiCl_4 + SiF_4 \rightarrow 2SiCl_2F_2$
(2) $SiCl_4 + SiF_4 \rightarrow SiCl_3F + SiClF_3$
(3) $SiCl_4 + SiClF_3 \rightarrow SiCl_2F_2 + SiCl_3F$
(4) $SiCl_3F + SiF_4 \rightarrow SiCl_2F_2 + SiClF_3$
(5) $SiCl_3F + SiClF_3 \rightarrow 2SiCl_2F_2$ The preparation of the chlorofluorosilane is usually carried out at a temperature within the range of from about 250° C. to 900° C., or even at higher temperatures. For best results, temperatures within the range of from 350° C. to 650° are used. At temperatures below 350° C. the rate of reaction is low; whereas operating at temperatures above 650° C. does not result in any appreciable increase in yields of the chlorofluorosilanes, but does increase costs.

The reaction can be carried out in any suitable reaction vessel constructed of glass, quartz, steel, copper or iron. Other materials in addition to porous plate can be used as contact surfaces in the reaction vessel. These include porcelain, quartz, glass, metal, etc. In some instances, particularly at the higher reaction temperatures, it is advantageous to omit the contact surfaces.

The products obtained by the practice of this invention are useful for a number of commercial purposes. They are particularly valuable as intermediates for the preparation of a large number or organic and inorganic compounds of silicon.

As many apparently widely different embodiments of this invention may be made without departing from the spirit and scope thereof, it is to be understood that we do not limit ourselves to the specific embodiments thereof except as defined in the appended claims.

Having described the present invention, the following is claimed as new and useful:

1. The process for obtaining chlorofluorosilanes, which comprises heating a compound having the general formula SiCl₃X, wherein X is an atom selected from the group consisting of chlorine and fluorine atoms, with a compound having the general formula SiXF₃, wherein X is an atom selected from the group consisting of fluorine and chlorine atoms.

2. The process according to claim 1 wherein the reaction is effected at a temperature within the range of from 350° C. to 650° C.

3. The process for obtaining chlorofluorosilanes, which comprises heating a mixture of silicon tetrachloride and silicon tetrafluoride to a temperature within the range of from 350° C. to 650° C.

4. The process for obtaining dichlorodifluorosilane, which comprises heating a mixture of silicon tetrachloride and silicon tetrafluoride to a temperature within the range of from 350° C. to 650° C., cooling the resultant effluent gases to remove the dichlorodifluorosilane, and recycling the residual gases through the reaction mixture.

5. The process for obtaining dichlorodifluorosilane, which comprises heating a mixture of chlorotrifluorosilane and trichlorofluorosilane to a temperature within the range of from 350° C. to 650° C.

JULIAN W. HILL.
RICHARD V. LINDSEY, Jr.
RICHARD H. WILEY.